United States Patent
Schmuhl et al.

(10) Patent No.: US 7,223,089 B2
(45) Date of Patent: *May 29, 2007

(54) INFINITELY ADJUSTABLE CALIBRATING SHELL FOR CONTINUOUS EXTRUDED PLASTIC PARTS, IN PARTICULAR PLASTIC PIPES

(75) Inventors: Jörg Schmuhl, Konigs Wusterhausen (DE); Torsten Schulze, Bad Oeynhausen (DE)

(73) Assignee: INOEX GmbH, Bad Oeynhausen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/249,748

(22) Filed: Oct. 14, 2005

(65) Prior Publication Data

US 2006/0051447 A1    Mar. 9, 2006

Related U.S. Application Data

(63) Continuation of application No. PCT/EP2004/003966, filed on Apr. 15, 2004.

(30) Foreign Application Priority Data

Apr. 17, 2003   (DE) ................... 103 18 137

(51) Int. Cl.
*B29C 47/90* (2006.01)
(52) U.S. Cl. ............... 425/326.1; 425/71; 425/387.1; 425/392
(58) Field of Classification Search ............... 425/70, 425/71, 72.1, 325, 326.1, 387.1, 392
See application file for complete search history.

(56) References Cited

U.S. PATENT DOCUMENTS 2,981,975 A    5/1961  Steierman ............... 264/561
3,600,488 A    8/1971  Yazawa .................... 425/392
3,904,334 A *  9/1975  Yazawa et al. ............ 425/71
4,408,970 A * 10/1983  Bustin et al. ............. 425/72.1

(Continued)

FOREIGN PATENT DOCUMENTS

DE    26 16 197 A1    10/1976

(Continued)

OTHER PUBLICATIONS

International Search Report dated Sep. 1, 2004 in PCT/EP2004/003966, filed Apr. 15, 2004 (2 pages); Written Opinion (3 pages); and Attachment to Written Opinion (1 page), No Translation.
German Office Action dated Oct. 26, 2005 in German Application No. 10 2005 002 820.9-16, filed Jan. 20, 2005 (3 pages), No Translation.
English language "International Preliminary Report on Patentability" dated Mar. 9, 2006 in PCT application No. PCT/EP2004/003966, filed Apr. 15, 2004 (7 pages).

*Primary Examiner*—Robert Davis
*Assistant Examiner*—Joseph Leyson
(74) *Attorney, Agent, or Firm*—Shlesinger, Arkwright & Garvey LLP

(57) ABSTRACT

Infinitely adjustable calibrating shell includes a central piece formed by strips or bands which are hingedly connected to each other and intersect like an extendable lattice that is formed into a shell. Preferably, the ends of the strips are movably connected to annular heads. The inner diameter of the central piece which is decisive for the calibrating process, can be modified by axially changing the distance between the annular heads, the cross section of the central piece having a circular shape in each axial position. The infinitely adjustable calibrating shell is suitable for continuous extruded plastic parts, in particular plastic pipes.

12 Claims, 2 Drawing Sheets

U.S. PATENT DOCUMENTS

| | | | |
|---|---|---|---|
| 4,453,907 A | * | 6/1984 | Taguchi .................... 425/326.1 |
| 4,650,407 A | * | 3/1987 | Taguchi ..................... 425/72.1 |
| 4,655,988 A | | 4/1987 | Shinmoto et al. ........... 264/566 |
| 4,784,597 A | * | 11/1988 | Akane ..................... 425/326.1 |
| 5,891,481 A | * | 4/1999 | Pedersen ..................... 425/71 |
| 6,946,094 B2 | * | 9/2005 | Shober ....................... 264/568 |

FOREIGN PATENT DOCUMENTS

| | | |
|---|---|---|
| DE | 44 08 064 C1 | 9/1995 |
| DE | 198 43 340 A1 | 4/2000 |
| DE | 200 00 872 U1 | 7/2000 |
| DE | 200 23 052 U1 | 12/2002 |
| DE | 102 06 276 A1 | 9/2003 |
| DE | 20 2004 008 107 U1 | 9/2004 |
| DE | 10 2004 029 498 B3 | 10/2005 |
| EP | 1 157 805 A1 | 11/2001 |

* cited by examiner

INFINITELY ADJUSTABLE CALIBRATING SHELL FOR CONTINUOUS EXTRUDED PLASTIC PARTS, IN PARTICULAR PLASTIC PIPES

CROSS-REFERENCE TO RELATED APPLICATIONS

This application is a continuation of application no. PCT/EP2004/003966, filed Apr. 15, 2004, which claims the priority of German application no. 103 18 137.7, filed Apr. 17, 2003, and each of which is incorporated herein by reference.

FIELD OF THE INVENTION

The invention relates to an infinitely adjustable calibrating shell for continuous extruded plastic parts, in particular plastic pipes, with a removable middle section formed by a set of flexible bands that abut the plastic part and run inclined relative to the axis of the calibrating shell, wherein its bands can be adjusted in terms of their mutual distance.

BACKGROUND OF THE INVENTION

In extruding systems for plastic parts, in particular plastic pipes, a refrigerating segment comprised of several cooling chambers is arranged in back of the extruder with its extruder implement viewed in the direction of production. The inlet of the first cooling chamber under a vacuum is formed by a calibrating shell, in which the external dimensions of the plastic part are calibrated to the specified size. The excessively large plastic part exiting the extruder element in a warm, and hence still formable state is reduced to the specified size in the calibrating shell. This is accomplished by the vacuum in the cooling chamber draws the part, in particular the plastic pipe, to the interior wall of the calibrating shell via the holes provided in the calibrating shell.

In order to produce plastic parts with varying external dimensions, in particular external diameters, in one and the same extruding system, it is known either to replace the calibrating shell or use a calibrating shell with an infinitely adjustable diameter. However, circular cross sections cannot be achieved with most known infinitely adjustable calibrating shells, since the calibrating shell consists of segments. In addition, the adjustment range of such calibrating shells is comparatively small (DE 198 43 340 A1, DE 200 00 872 U1, DE 200 23 052 U1, EP 11 57 805 A1).

Another known infinitely adjustable calibrating shell (DE 44 08 064 C1) makes it possible to achieve an absolutely circular cross section of the extruded part. In this calibrating shell, the middle section consists of bands wound in the form of a two-start thread with a high pitch. Turning both ends of this middle section toward each other permits only a variation of its internal diameter within narrow limits. The windings of the band are secured against lateral deflection by support rails arranged parallel to the calibrating shell, preferably having a flexible design in the circumferential direction of the calibrating shell. Such support rails limit the adjustment path of the calibrating shell. Another disadvantage is that the calibrating shell lacks a high intrinsic stiffness, so that the terminal annular heads absolutely must be connected with each other by several supporting pipes.

OBJECTS AND SUMMARY OF THE INVENTION

An object of the invention is to provide an infinitely adjustable calibrating shell of the kind mentioned at the outset that has a wide adjustment range and high intrinsic stiffness.

This object is achieved in a calibrating shell of the kind mentioned at the outset by having the bands of the one set crisscross with flexible bands of another set like an axially removable lattice grate, and hinged together at intersecting points of this lattice grate. The grouped, axially parallel intersecting points here advantageously align flush in each adjustment position of the calibrating shell, while the grouped intersecting points lying in radial planes remain in their respective radial plane in each adjustment position of the calibrating shell.

The calibrating shell according to the invention, which is also infinitely adjustable during operation, is characterized by a wide adjustment range and a high intrinsic stiffness. The plurality of crisscrossing bands coupled with each other ensures an absolutely circular shape at each set diameter. The adjustable lattice grate molded into a shell gives the calibrating shell a high intrinsic stiffness, so that it need not even be supported or guided in the simplest case. The adjustment range of the calibrating shell arises from the total width of the individual bands and the circumference in their attachment area. To obtain the widest possible adjustment range, the circumference of the heads in the attachment area of the bands should measure 40% to 60% of the total width of all bands. The adjustment range can also be defined via the inclination angle of the bands relative to the central axis of the calibrating shell. It should lie between 30° and 75°.

The middle section can also have more or less conical transitional sections that consist of bands and are movably secured to annular heads. In one structurally simple embodiment of the invention, however, the band ends of the one set are movable, in particular hinged to annular heads, and form transitional sections between the annular heads and the middle section, which are more or less conical as a function of how far the middle section has been adjusted or extended.

The bands of the middle section can basically extend only over a few intersecting points. However, all flexible bands preferably extend over the entire length of the middle section, and have a high tensile strength. This embodiment is not just structurally simple, but also dimensionally stable.

Even though the hinged connection of oppositely running bands preferably already ensures a sufficient intrinsic stiffness at all intersecting/hinged points given a slight adjustability of the band-shaped middle section, it may make sense to secure guiding elements (13) slidably mounted in an axial guide (14) between the crisscrossing bands, which lie in an axial plane of the calibrating shell.

In the simplest case, the diameter can be infinitely adjusted or extended by hand by varying the distance of the annular heads.

However, a mechanical, in particularly motorized, adjustment unit is preferably provided for this purpose.

As already mentioned, the adjustable middle section of the calibrating shell has a high intrinsic stiffness. However, since the calibrating shell has a high weight especially with the part running through, the hinged points are advantageously relieved by allocating a height-adjustable support thereto.

The invention will be described in greater detail below based on a drawing that shows an exemplary embodiment. Shown on:

DETAILED DESCRIPTION OF THE INVENTION

Figure 1:
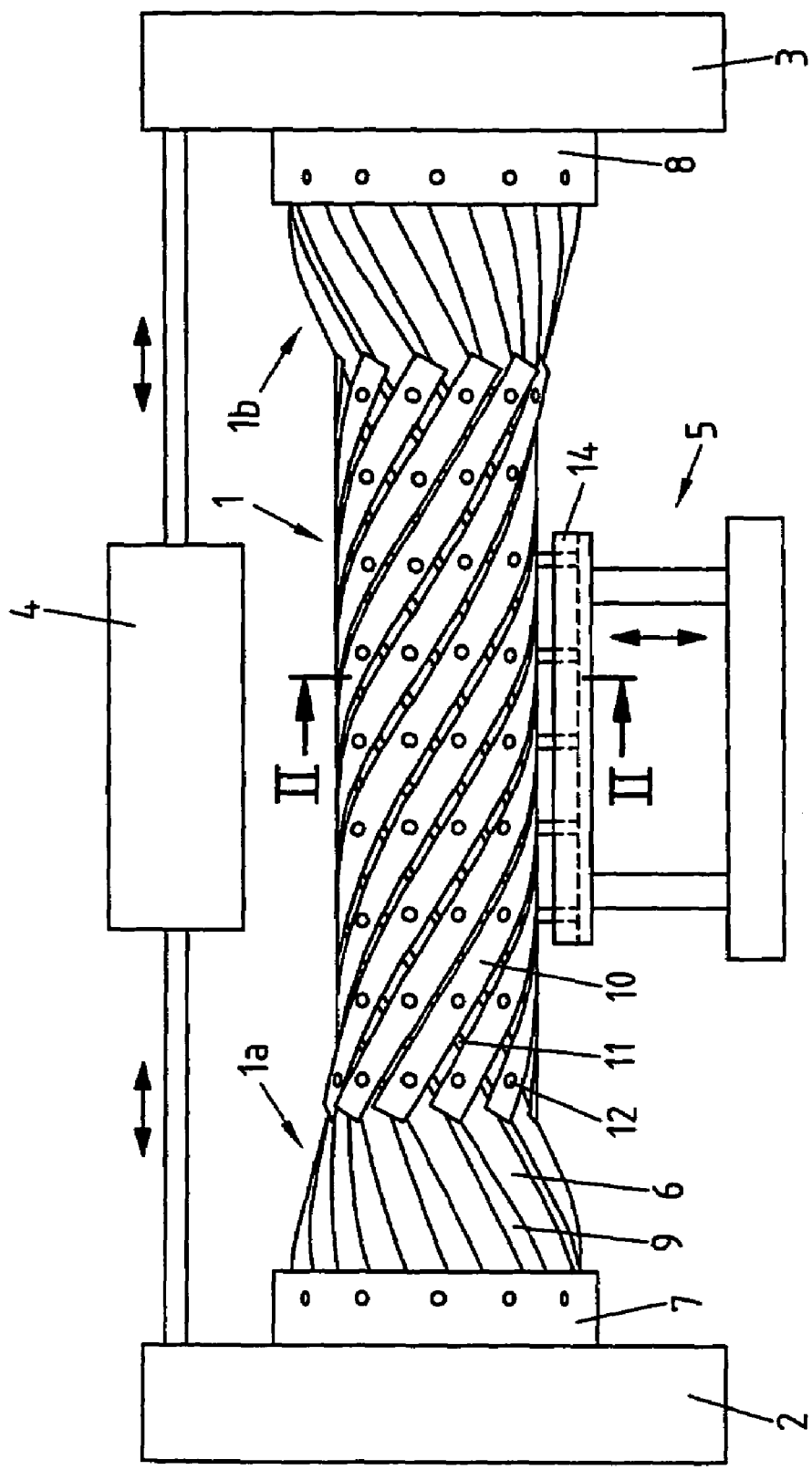
FIG. 1 is a calibrating shell in a first setting, side view.

The calibrating shell essentially consists of a middle section 1 infinitely adjustable in terms of diameter, and annular heads 2, 3. A motorized lengthwise adjustment unit 4 operates between the terminal heads 2, 3. The middle section 1 rests on a height-adjustable supporting device 5.

The middle section 1 includes respective first and second sets of flat bands 6, 10 that intersect like a lattice grate and are hinged together at the intersecting points, in particular made of sheet steel. The first and second bands 6, 10 connected like a lattice grate form a shell. The sum of widths of these bands 6 in the connection area 7, 8 of the annular heads 2, 3 comprises about 40% to 60% of the circumference of the connection area 7, 8, leaving air gaps 9 between the bands in the setting shown on FIG. 1 in the transitional areas 1a, 1b of the middle section 1 here forming an inlet and outlet cone. While the bands 6 extend up to the heads 2, 3, the crisscrossing bands 10 only extend into the area of the middle section 1. In the position shown on FIG. 1, they are also split up by air gaps 11. As also evident from FIG. 1, each of these bands 10 is not hinged by a joint with the other bands 6 at each intersecting point, but rather only with every second band 6. In addition, the joints 12 of adjacent bands 10 are respectively offset by one band 6 relative to each other. The lower joints 12 are flush with each other and lie parallel to the central axis, and exhibit guiding elements 13 designed as pins that are guided in a groove 14 of the height-adjustable supporting device 5.

Figure 3:
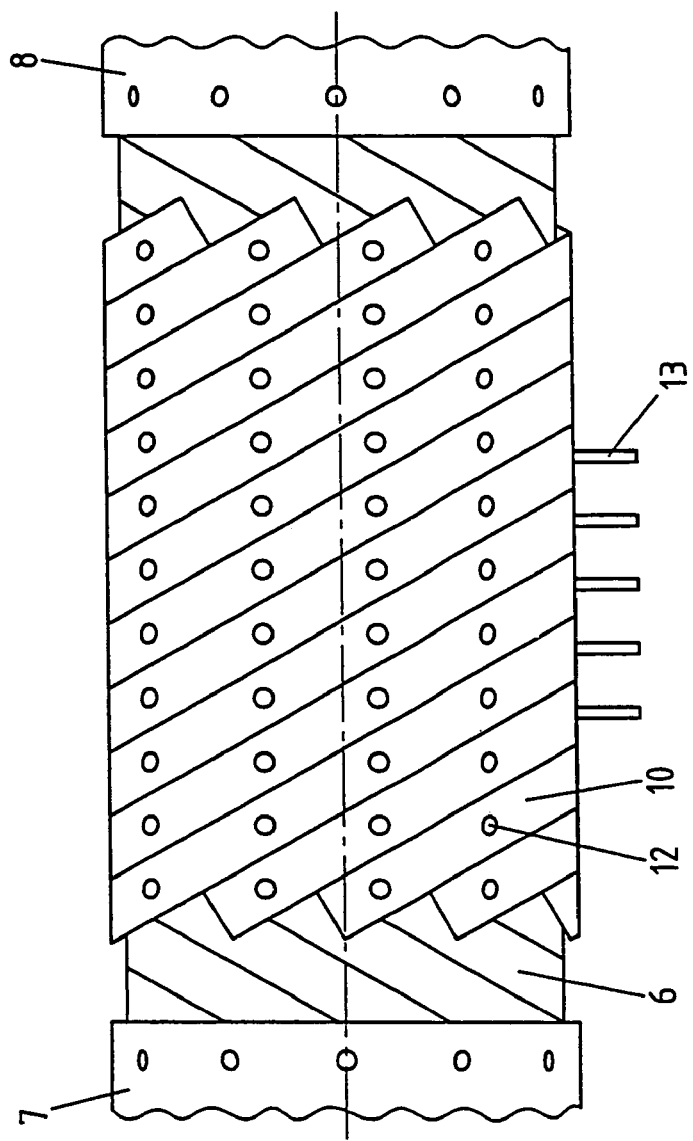
Figure 2:
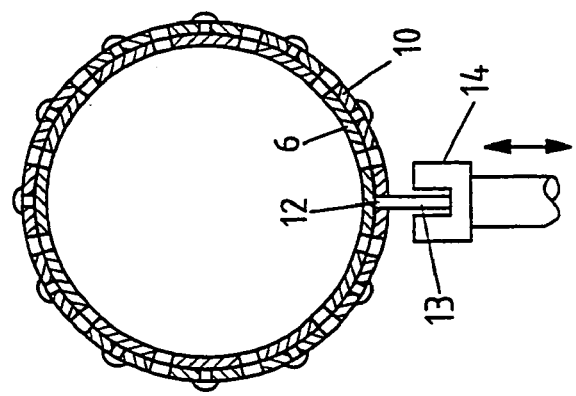
FIG. 2 is the calibrating shell according to FIG. 1, cross section along line II—II of FIG. 1, and on
FIG. 3 is the calibrating shell according to FIG. 1 in a setting different than on FIG. 2.

The rough setting limits for the diameter range may be gleaned from the comparative views on FIGS. 1 and 3 for various adjustment positions of the calibrating shell.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

The invention claimed is:

1. An infinitely adjustable calibrating shell for extruded plastic parts, comprising:
   a) an extendable middle section formed by a first set of first flexible bands which abut a plastic part, in use, and the first flexible bands running inclined relative to an axis of the calibrating shell;
   b) the first flexible bands being adjustable in terms of their mutual distance;
   c) a second set of second flexible bands being provided; and
   d) the bands of the first set of flexible bands crisscrossing the flexible bands of the second set of flexible bands like an extendable lattice grate, and being hinged together at intersecting points of the lattice grate.

2. The calibrating shell according to claim 1, wherein:
   a) the intersecting points are grouped, axially parallel intersecting points, which align flush in each adjustment position of the calibrating shell on the one hand; and
   b) the grouped intersecting points lie in respective radial planes and remain in their respective radial planes in each adjustment position of the calibrating shell on the other hand.

3. The calibrating shell according to claim 1, wherein:
   a) ends of the bands of one of the first and second sets are movably connected to annular heads, and form transitional sections between the annular heads and the middle section, which are substantially conical as a function of how far the middle section is extended.

4. The calibrating shell according to claim 1, wherein:
   a) the first and second sets of flexible bands extend over the entire length of the middle section.

5. The calibrating shell according to claim 1, wherein:
   a) the first and second sets of flexible bands have a high tensile strength.

6. The calibrating shell according to claim 1, wherein:
   a) the inclination angle of the bands relative to the central axis of the calibrating shell can be adjusted between 30° and 75° depending on how far the middle section is extended.

7. The calibrating shell according to claim 3, wherein:
   a) the sum of the widths of the bands in a connection area of the annular heads measures 40% to 60% of the circumference of the connection area.

8. The calibrating shell according to claim 1, wherein:
   a) guiding elements are slidably mounted in an axial guide and are secured between the crisscrossing bands, which lie in an axial plane of the calibrating shell.

9. The calibrating shell according to claim 3, wherein:
   a) a lengthwise adjustment unit operates between the annular heads.

10. The calibrating shell according to claim 3, wherein:
    a) a height-adjustable supporting device is provided for the extendable middle section of the calibrating shell between the annular heads.

11. Infinitely adjustable calibrating shell as in claim 1, wherein:
    a) the calibrating shell is configured for extruding substantially circular plastic pipes.

12. The calibrating shell according to claim 3, wherein:
    a) the movably connected ends of the bands of the one set are hingedly connected.

* * * * *